July 24, 1934.  C. C. CONVERSE  1,967,868
ANTIGLARE SHIELD
Filed May 15, 1931
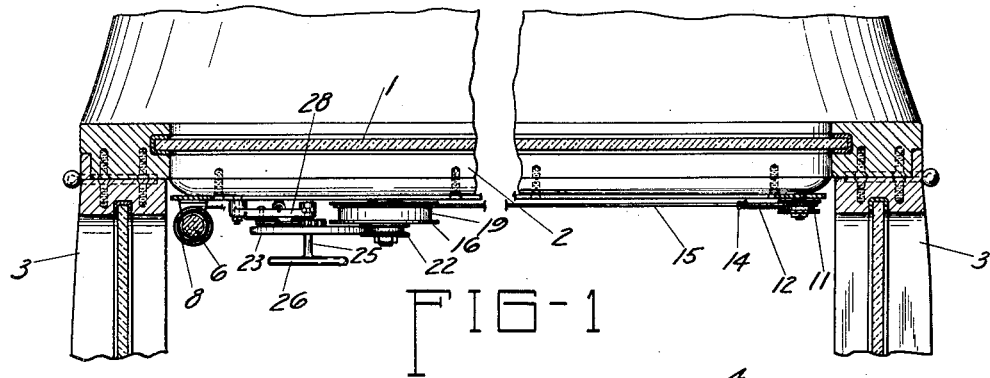
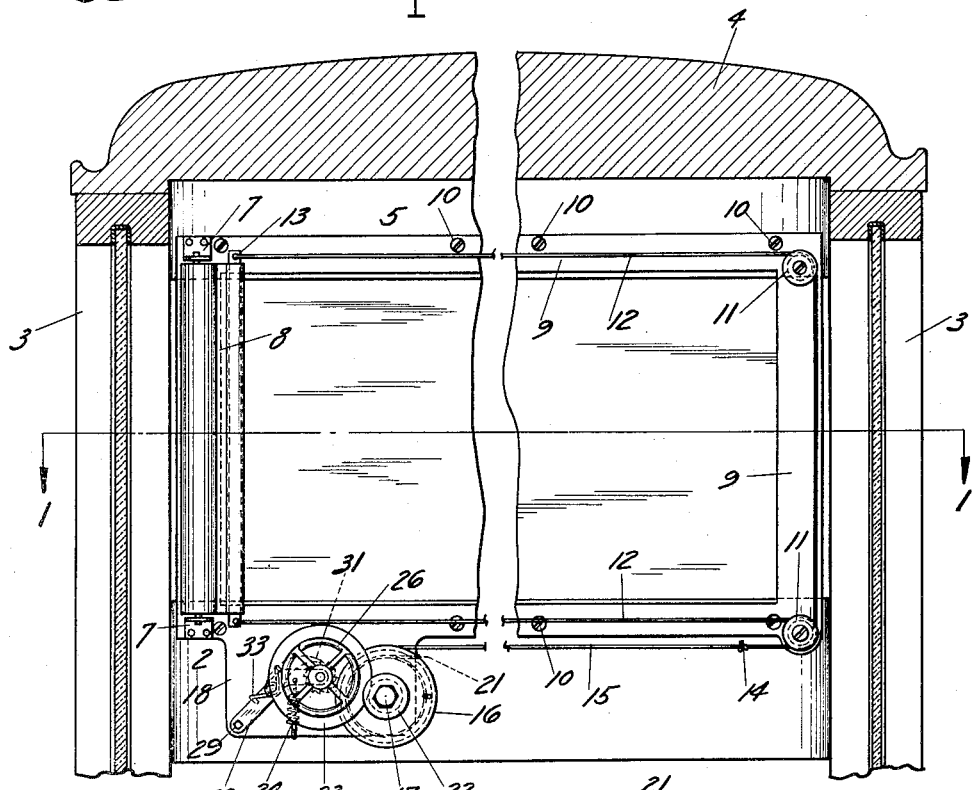
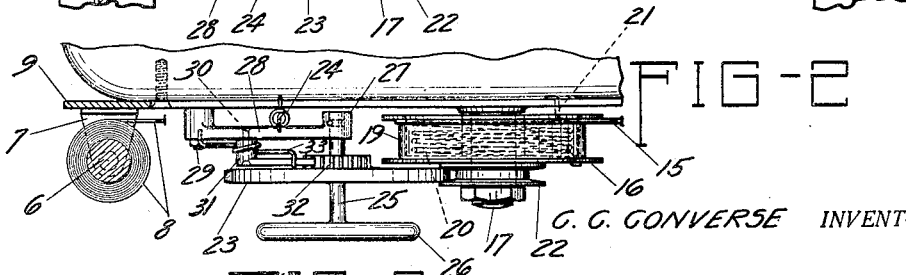
C. C. CONVERSE INVENTOR.
BY Merrill M. Blackburn.
ATTORNEY.

Patented July 24, 1934

1,967,868

UNITED STATES PATENT OFFICE

1,967,868
ANTIGLARE SHIELD

Charles C. Converse, Bismarck, N. Dak.

Application May 15, 1931, Serial No. 537,615

6 Claims. (Cl. 296—97)

The present invention relates to the type of devices shown in Patents Nos. 1,468,115 and 1,526,346 issued to A. E. Kivikink and No. 1,427,038 issued to E. W. Toadvine. Stated generally, the purpose of this invention is to provide an improved construction of the type indicated. Further objects of the invention are to provide an apparatus of the character indicated which will shut out all glare coming through the windshield or a greater or less proportion thereof; to provide a construction which can be easily and quickly operated to shut off more or less of the glare from sunshine or approaching headlights; to provide a structure of the character indicated which is semi-automatic in its operation, that is, being manually controlled to a certain extent, and will, under certain circumstances, become automatic in its operation; to provide an improved mechanism for operation of a structure of the character indicated; and such further objects, advantages and capabilities as will hereafter appear and as are inherent in the construction disclosed herein. My invention further resides in the combination, construction and arrangement of parts illustrated in the accompanying drawing and, while I have shown therein what is now considered the preferred embodiment of this invention, I desire the same to be understood as illustrative only and not to be interpreted in a limiting sense.

In the drawing annexed hereto and forming a part hereof,

Fig. 1 is a horizontal section of the front portion of an automobile, substantially along the plane indicated by the line 1—1 Fig. 2;

Fig. 2 is a fragmentary vertical section through the front part of an automobile illustrating the application of my improvement thereto;

Fig. 3 is a fragmentary plan view, on a somewhat larger scale than shown in Fig. 1, illustrating the operating mechanism.

Reference will now be made in greater detail to the annexed drawing in which the glass of the windshield is denoted by the numeral 1, the frame structure below the windshield by the numeral 2 and the doors of the automobile by the numeral 3. No attempt has been made to show in detail the construction of the top 4 of the vehicle, the same being shown as if it were a solid structure. It is customary to have a frame element just above the windshield and this I have indicated by the numeral 5. A spring shade roller 6, which differs from ordinary shade rollers in that there are no locking dogs to prevent winding up motion when the tension on the member carried by the roller is released, is mounted in bracket 7. These brackets may be mounted directly on the frame surrounding the windshield or may be, as shown, mounted upon a separate frame which is secured to the automobile. A colored, more or less transparent, flexible member 8 is secured to the roller 6 and wound up thereon by the spring of the roller, as is well known. If desired, this glare shield, which is mounted on the roller, may vary in transparency from its forward end to the end which is attached to the roller. Thus, the farther the shield is pulled out, the greater will be its effect upon brilliant illumination passing through the windshield. Therefore, if approaching headlights are not excessively bright, the shield may be pulled out only a short distance. On the other hand, if the approaching headlights are very brilliant, the shield may be extended farther and farther until the density of the color is sufficient to satisfy the requirements of the driver in the matter of cutting off excessive illumination. The same result may be accomplished by variations in texture of the shield.

The separate frame upon which the glare shield is mounted is indicated by the numeral 9 and is shown as being attached to the automobile by means of the screws 10. On two corners of this frame are mounted rollers 11 over which pass the cords 12 connected to the ends of the bar 13 which is secured to the end of the flexible sheet 8, as by being passed through a loop at the end thereof, in a manner similar to window shades. It is preferred to join the two cords 12, as indicated at 14, and have a single cord 15 run from this point to the winding drum 16.

The operating mechanism for the flexible member will next be described in connection more especially with Fig. 3. A stud 17 is mounted on a downwardly extending portion 18 of the frame 9. A hub is shown in Fig. 3 as surrounding the stud 17, being indicated by dotted lines. Between the hub and the web 19 of the drum 16 is a space in which is mounted a suitable spring 20 having an end 21 engaged with the frame and its other end with the drum so that the spring will always have a tendency to turn the drum in a direction to wind the cord 15 thereon. This spring is not strong enough to exert a tension equal to the spring of the roller 6 and, therefore, when the parts are free to move, the roller spring will cause complete winding up of the flexible member 8 and tightening of the coils of spring 20, as the cord 15 is unwound from the winding drum. While I have disclosed a specific arrangement of winding drum 16 and spring 20, it is not my intention to be limited to such construction, as I have in mind several constructions, any one of which will serve my purpose equally as well as the one disclosed herein.

Also mounted on the stud 17 and secured to the drum 16 is a spool-shaped, friction member 22 having the inner faces of its flanges inclined slightly so that the edge of the friction disc 23 will be pinched between these flanges as the disc 23 is forced toward the spool 22 by the tension of spring 24. The sharp corners of the disc 23 are rounded off just enough to prevent them from forming grooves in the inner faces of the flanges of spool 22. Inasmuch as various operating mechanisms may be used for rotating the drum and I have others in mind which will serve this purpose, I desire that my invention shall not be limited to the particular details here disclosed. A shaft 25 having a suitable hand-wheel 26, or its equivalent, passes through and is secured to the disc 23, or is integral therewith, and has its inner end mounted at 29 so that it is free to turn under the influence of spring 24, as set forth above. A pivot member 30 is carried by the arm 28 and has a dog 31 mounted thereon for engagement with the ratchet 32, to prevent undesired winding up of the flexible member under the influence of the roller spring. The dog or pawl is held in engagement with the ratchet 32 by means of a spring 33, or an equivalent thereof.

From the foregoing it will be apparent that when the hand-wheel 26 is turned in a clockwise direction, as shown in Fig. 2, the winding drum 16 will be turned in a reverse direction and will cause winding up of the cord 15 and extension of the flexible member 8. During this winding, the ratchet 32 turns under the pawl 31 and is normally latched against reverse rotation. This will therefore hold the shield 8 in extended position. If it is desired to release the shield so that it may return to the position illustrated in Fig. 2, it is necessary only to lift up on the hand-wheel 26 which will take the disc 23 out of engagement with the spool 22 and leave the same and the drum 16 free to rotate under the influence of the roller spring in roller 16, the cords 12 and 15 being kept taut by the spring 20. Owing to the ratio of the circumferences of the disc 23 and spool 22, the cord 15 will be wound up rapidly as the hand-wheel 26 is turned. This will result in correspondingly rapid extension of the shield 8. Rapid retraction of this shield is accomplished by lifting up on the hand-wheel 26. The shield may be permitted to retract wholly or only partially, as desired, by holding the disc out of engagement with spool 22 until the winding operation is wholly or only partially completed. Since there is no positive connection between the spool 22 and disc 23, it will be possible, by turning the hand-wheel 26, to draw the shield 8 out to the limit of its motion without running any risk of injuring the mechanism, since the disc will slip in relation to the spool as soon as it is impossible for the spool to turn farther. If one attempts to turn the hand-wheel in a reverse direction, the result will be to raise the hand-wheel and the disc 23, thus releasing the drum for reverse rotation under the influence of the roller spring.

It is of course understood that the specific description of structure set forth above may be departed from without departing from the spirit of my invention as set forth in this specification and the appended claims.

Having now described my invention, I claim:

1. Anti-glare mechanism comprising a frame mountable in proximity to an automobile windshield, a spring roller carried by said frame, a flexible glare-reducing sheet connected to said roller to be rolled up thereon and extending transversely of the windshield when extended, a winding drum, flexible means connected thereto and to the said sheet, said flexible means when wound on the drum causing said sheet to be extended more or less across the width of the windshield, and manual means for rotating said drum to cause winding of said flexible means on the drum, the winding drum having a spool-shaped friction member connected thereto to cause rotation thereof, and the manual means having a disc-shaped member to cooperate with the spool-shaped member in transmitting power to the winding drum.

2. A structure for the purpose indicated comprising a flexible glare-reducing sheet extensible to a greater or less degree across the width of a windshield, and means for causing extension thereof, said means comprising a winding drum having a friction member fixedly connected thereto, a second friction member mounted adjacent the first friction member means for normally resiliently holding the second friction member in contact with the first friction member, means for turning the second friction member, and means connected to the winding drum to be wound thereon and to said sheet to cause extension thereof.

3. A structure as defined by claim 2 in which the second friction member is carried by a pivotally mounted arm located adjacent the first mentioned friction member, said arm swinging toward and away from the first mentioned friction member to carry the second mentioned friction member into and out of contact therewith.

4. A structure for the purpose indicated comprising a flexible glare-reducing sheet extensible to a greater or less degree across the width of a windshield, and means for causing extension thereof, said means comprising a winding drum having a friction member fixedly connected thereto, said friction member having its edge grooved for reception of the edge of a second friction member, a second friction member mounted adjacent the first friction member means for normally resiliently holding the second friction member in contact with the first friction member with its edge in the groove of the first mentioned friction member, means for turning the second friction member, and means connected to the winding drum to be wound thereon and to said sheet to cause extension thereof.

5. Anti-glare mechanism comprising a frame mountable in proximity to an automobile windshield, a spring roller carried by said frame adjacent one side thereof, a flexible glare-reducing sheet connected to said roller to be rolled up thereon and extending transversely of the windshield when extended, a winding drum, flexible means connected thereto and to the said sheet, said flexible means when wound on the drum causing said sheet to be extended more or less across the width of the windshield, manual means for rotating said drum to cause winding of said flexible means on the drum, and means enabling the operator to interrupt and reestablish the driving connections between the manual means and the winding drum, instantly and at will, and without removal of or injury to any part of the apparatus.

6. A structure as defined by claim 5 having means for holding said sheet in any extended position without the application of manual force.

CHARLES C. CONVERSE.